(12) United States Patent
Kim et al.

(10) Patent No.: US 8,462,754 B2
(45) Date of Patent: Jun. 11, 2013

(54) ANTENNA SHARING FOR RADIO FREQUENCY SIGNALS IN SAME FREQUENCY BANDS

(75) Inventors: Beomsup Kim, Cupertino, CA (US); Charles J Persico, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 427 days.

(21) Appl. No.: 12/795,562

(22) Filed: Jun. 7, 2010

(65) Prior Publication Data

US 2011/0299510 A1    Dec. 8, 2011

(51) Int. Cl.
*H04H 20/67* (2008.01)

(52) U.S. Cl.
USPC ........ 370/339; 370/310.2; 370/328; 455/341; 455/422.1

(58) Field of Classification Search
USPC .............. 370/310.2, 328–339, 349; 455/13.3, 455/127.3, 144, 253.2, 291, 293, 309, 311, 455/341, 422.1
See application file for complete search history.

(56) References Cited

U.S. PATENT DOCUMENTS

| | | | |
|---|---|---|---|
| 4,144,495 A | 3/1979 | Metzger | |
| 6,806,768 B2 * | 10/2004 | Klaren et al. | 330/124 R |
| 2002/0024469 A1 * | 2/2002 | Masaki | 343/702 |
| 2006/0030265 A1 * | 2/2006 | Desai et al. | 455/41.2 |
| 2007/0183338 A1 * | 8/2007 | Singh et al. | 370/252 |
| 2007/0207752 A1 * | 9/2007 | Behzad | 455/132 |
| 2008/0139151 A1 * | 6/2008 | Ojo et al. | 455/234.1 |
| 2009/0239471 A1 * | 9/2009 | Tran et al. | 455/41.2 |
| 2009/0253384 A1 * | 10/2009 | Gorbachov | 455/83 |
| 2010/0008338 A1 * | 1/2010 | Tsfati et al. | 370/338 |
| 2010/0210299 A1 * | 8/2010 | Gorbachov | 455/552.1 |
| 2011/0074521 A1 * | 3/2011 | Chernyakov et al. | 333/134 |

FOREIGN PATENT DOCUMENTS

EP    1729464 A1    12/2006

OTHER PUBLICATIONS

International Search Report and Written Opinion—PCT/US2011/039517, International Search Authority—European Patent Office—Aug. 24, 2011.

* cited by examiner

*Primary Examiner* — Hoon J Chung
(74) *Attorney, Agent, or Firm* — William M. Hooks

(57) ABSTRACT

A wireless device for receiving composite signals is disclosed. The wireless device includes an antenna. The wireless device also includes a first amplifier coupled to the antenna. The wireless device further includes a second amplifier coupled to the antenna. The wireless device also includes a first receiver. The wireless device further includes a second receiver. The wireless device also includes a first switch that couples the first receiver to the output of either the first amplifier or the second amplifier. The wireless device further includes a second switch that couples the second receiver to the output of either the first amplifier or the second amplifier.

47 Claims, 11 Drawing Sheets

US 8,462,754 B2

ANTENNA SHARING FOR RADIO FREQUENCY SIGNALS IN SAME FREQUENCY BANDS

TECHNICAL FIELD

The present disclosure relates generally to wireless communication systems. More specifically, the present disclosure relates to systems and methods for antenna sharing for radio frequency signals in the same frequency bands.

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers and the like. Consumers have come to expect reliable service, expanded areas of coverage, and increased functionality.

A wireless communication device may be capable of communicating using multiple wireless communication standards. For example, a wireless communication device may be capable of communicating using both a wireless local area network (WLAN) and Bluetooth. In some instances, a wireless communication device may communicate using multiple wireless standards concurrently. For example, a Bluetooth stereo headset may receive music from a computer while the computer downloads songs from an Internet website using a wireless local area network (WLAN IEEE 802.11a, b, g, n standard).

Currently, Bluetooth and a wireless local area network (WLAN) operate independently and may interrupt each other, since there is no coordination between Bluetooth and a wireless local area network (WLAN) in the protocol level. A radio frequency (RF) receiver needs to handle desired signals at or near minimum sensitivity in the presence of strong/jamming interfering signals.

Standards such as the Institute of Electrical and Electronics Engineers (IEEE) 802.15 and Bluetooth Profiles have tried to solve this problem by controlling the timing of the transmitted RF signal from each device to avoid RF signal mixing. However, time multiplexing reduces throughput and requires extensive CPU time. Other methods such as interference cancellation have been tried but provide only limited use in practice.

DETAILED DESCRIPTION

Figure 1:
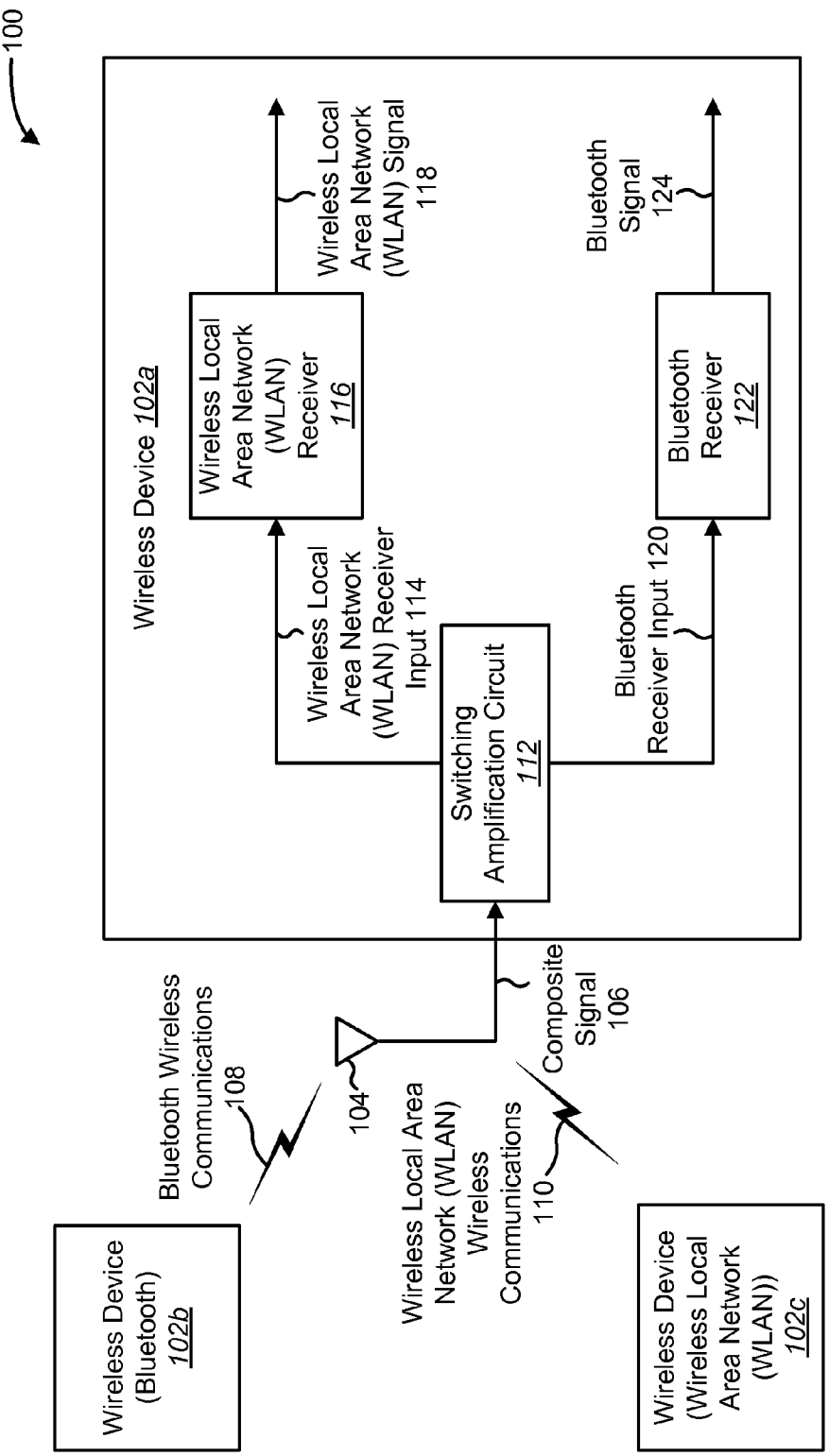
FIG. 1 shows a wireless communication system with multiple wireless devices.

A wireless device for receiving composite signals is described. The wireless device includes an antenna, a first amplifier coupled to the antenna, a second amplifier coupled to the antenna, a first receiver, a second receiver and a first switch that couples the first receiver to the output of either the first amplifier or the second amplifier. The wireless device also includes a second switch that couples the second receiver to the output of either the first amplifier or the second amplifier.

The wireless device may include a coupling between the antenna and the second amplifier. The coupling may have some loss without substantially degrading the performance or sensitivity of the first amplifier. The coupling may include one or more passive devices and/or active devices. The passive devices and/or active devices may be reconfigurable through a controller. The amount of loss in the coupling may be programmable. The passive devices and/or active devices may be controlled by control signals. The amount of the loss may be programmed by the control signals. The wireless device may also include a switch controller that controls the first switch and the second switch. The switch controller may be in either an analog portion or a baseband portion. The switch controller may be programmable.

A composite signal may include a first wireless signal based on a first wireless standard and a second wireless signal based on a second wireless standard in the same signal band. The first wireless signal may be a Bluetooth signal and the second wireless signal may be a wireless local area network (WLAN) signal. The first receiver may be a WLAN receiver and the second receiver may be a Bluetooth receiver.

The switch controller may be coupled to an output of the WLAN receiver. The output of the WLAN receiver may be compared with a WLAN threshold. The first switch may couple the WLAN receiver to the output of the first amplifier when the output of the WLAN receiver is less than the WLAN threshold. The first switch may couple the WLAN receiver to the output of the second amplifier when the output of the WLAN receiver is greater than the WLAN threshold.

The switch controller may be coupled to an output of the Bluetooth receiver. The output of the Bluetooth receiver may be compared to a Bluetooth threshold. The second switch may couple the Bluetooth receiver to the output of the first amplifier when the output of the Bluetooth receiver is less than the Bluetooth threshold. The second switch may couple the Bluetooth receiver to the output of the second amplifier when the output of the Bluetooth receiver is greater than the Bluetooth threshold.

The WLAN receiver may include a WLAN decoder that includes a low noise amplifier (LNA), a mixer, a programmable gain amplifier (PGA) and a filter. The WLAN receiver may also include a baseband filter that includes an analog to digital converter (ADC). The Bluetooth receiver may include a Bluetooth decoder that includes low noise amplifier (LNA), a mixer, a programmable gain amplifier and a filter. The Bluetooth receiver may also include a baseband filter that includes an analog to digital converter (ADC).

A method for receiving a composite signal using an antenna is described. A first switch setting for a first portion of the composite signal is determined. The composite signal is amplified using the first switch setting to obtain a first receiver input signal. A first signal is decoded from the first receiver input signal using a first receiver. A second switch setting for a second portion of the composite signal is determined. The composite signal is amplified using the second switch setting to obtain a second receiver input signal. A second signal is decoded from the second receiver input signal using a second receiver.

The first signal may be fed back to a switch controller. The switch controller may be programmable. Amplifying the composite signal may include amplifying the composite signal using either a first amplifier or a second amplifier. The first amplifier may be coupled to the antenna and the second amplifier may be coupled to the antenna. The WLAN switch setting may include the position of a device that can control signal path or direction. The device may couple the WLAN receiver to the output of either the first amplifier or the second amplifier. The device may be a switch.

Determining a WLAN switch setting may include comparing a feedback WLAN signal with a WLAN threshold. The feedback WLAN signal may be the decoded WLAN signal. The switch may couple a WLAN receiver input to the output of the first amplifier when the decoded WLAN signal is less than the WLAN threshold. The switch may couple a WLAN receiver input to the output of the second amplifier when the decoded WLAN signal is greater than the WLAN threshold. Decoding the WLAN portion of the composite signal may include amplifying the WLAN receiver input signal, downconverting the WLAN receiver input signal and filtering the WLAN receiver input signal.

The second switch setting may be a Bluetooth switch setting. The Bluetooth switch setting may include the position of a device that can control signal path or direction. The device may couple the Bluetooth receiver to the output of either the first amplifier or the second amplifier. The device may be a switch. Determining a Bluetooth switch setting may include comparing a feedback Bluetooth signal with a Bluetooth threshold. The feedback Bluetooth signal may be a decoded Bluetooth signal. The switch may couple a Bluetooth receiver input to the output of the first amplifier when the decoded Bluetooth signal is less than the Bluetooth threshold. The switch may couple a Bluetooth receiver input to the output of the second amplifier when the decoded Bluetooth signal is greater than the Bluetooth threshold. Decoding a Bluetooth signal may include amplifying the Bluetooth receiver input signal, downconverting the Bluetooth receiver input signal and filtering the Bluetooth receiver input signal. The Bluetooth signal may be fed back to a signal controller.

An apparatus for receiving a composite signal using a single antenna is also described. The apparatus includes means for determining a first switch setting for a first portion of the composite signal. The apparatus also includes means for amplifying the composite signal using the first switch setting to obtain a first receiver input signal. The apparatus further includes means for decoding a first signal from the first receiver input signal. The apparatus also includes means for determining a second switch setting for a second portion of the composite signal. The apparatus further includes means for amplifying the composite signal using the second switch setting to obtain a second receiver input signal. The apparatus also includes means for decoding a second signal from the second receiver input signal.

An integrated circuit for receiving composite signals is described. The integrated circuit includes a first amplifier coupled to an antenna, a second amplifier coupled to the antenna, a first receiver, a second receiver and a first programmable switch that couples the first receiver to the output of either the first amplifier or the second amplifier. The integrated circuit also includes a second programmable switch that couples the second receiver to the output of either the first amplifier or the second amplifier.

FIG. 1 shows a wireless communication system 100 with multiple wireless devices 102. A wireless device 102 may be a base station, a wireless communication device, a controller, or the like. A base station is a station that communicates with one or more wireless communication devices. A base station may also be referred to as, and may include some or all of the functionality of, an access point, a broadcast transmitter, a Node B, an evolved Node B, etc. The term "Base Station" will be used herein. Each base station provides communication coverage for a particular geographic area. A base station may provide communication coverage for one or more wireless communication devices. The term "cell" can refer to a base station and/or its coverage area depending on the context in which the term is used.

A wireless communication device may also be referred to as, and may include some or all of the functionality of, a terminal, an access terminal, a user equipment (UE), a subscriber unit, a station, etc. A wireless communication device may be a cellular phone, a personal digital assistant (PDA), a wireless device, a wireless modem, a handheld device, a laptop computer, etc. A wireless communication device may communicate with zero, one, or multiple base stations on the downlink and/or uplink at any given moment. The downlink (or forward link) refers to the communication link from a base station to a wireless communication device, and the uplink (or reverse link) refers to the communication link from a wireless communication device to a base station.

Wireless communication systems 100 may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, orthogonal frequency division multiple access (OFDMA) systems, and spatial division multiple access (SDMA) systems.

Communications between wireless devices in a wireless system (e.g., a multiple-access system) may be achieved through transmissions over a wireless link. Such a communication link may be established via a single-input and single-output (SISO), multiple-input and single-output (MISO), or a multiple-input and multiple-output (MIMO) system. A MIMO system includes transmitter(s) and receiver(s) equipped, respectively, with multiple transmit antennas and multiple receive antennas for data transmission. SISO and MISO systems are particular instances of a MIMO system. The MIMO system can provide improved performance (e.g., higher throughput, greater capacity, or improved reliability) if the additional dimensionalities created by the multiple transmit and receive antennas are utilized.

The wireless communication system 100 may utilize MIMO. At a transmitter, each portion of a data stream may be transmitted from a different antenna. At a receiver, the different portions of the data stream may be received by different antennas and then combined. A MIMO channel formed by the transmit and receive antennas may be decomposed into one or more independent channels, which are also referred to as spatial channels; each of the independent channels corresponds to a dimension.

A wireless device 102 may communicate with other wireless devices 102 using multiple wireless communication standards. For example, a wireless device 102a may receive Bluetooth wireless communications 108 from a wireless device 102b configured to communicate using Bluetooth while concurrently receiving wireless local area network (WLAN) wireless communications 110 from a wireless device 102c configured to communicate using a wireless local area network (WLAN). In one configuration, the wireless device 102a may be configured to receive Bluetooth wireless communications 108 and wireless local area network (WLAN) wireless communications 110 using a single antenna 104. The wireless device 102a may receive a composite signal 106 via the antenna 104. The composite signal 106 may include signals from two or more protocols in a shared spectrum. In one configuration, the composite signal 106 may include both Bluetooth signals and WLAN signals.

There is a strong desire to integrate Bluetooth and wireless local area network (WLAN) communications together in cellular phones and other consumer electronics. Sharing an antenna 104 between Bluetooth and a wireless local area network (WLAN) may save on printed circuit board (PCB) space and overall cost of a wireless device 102a. Since Bluetooth and a wireless local area network (WLAN) share the same frequency spectrum, it may be difficult to share a common antenna 104 for a concurrent operation without degrading performance metrics such as the receive sensitivity. For example, simply connecting the composite signal 106 to both a wireless local area network (WLAN) receiver 116 and a Bluetooth receiver 122 and using an RF signal to share the composite signal 106 between the two receivers will degrade the sensitivity by 3 dB.

Bluetooth wireless communications 108 and wireless local area network (WLAN) wireless communications 110 may both be received in the 2.4 gigahertz (GHz) industrial, scientific and medical (ISM) radio bands. Bluetooth and a wireless local area network (WLAN) may operate independently and asynchronous and sometimes interrupt each other since there is no coordination between Bluetooth and a wireless local area network (WLAN) on a protocol level. Thus, the composite signal 106 received may include both the Bluetooth wireless communications 108 and the wireless local area network (WLAN) wireless communications 110.

Signal strength between Bluetooth wireless communications 108 and wireless local area network (WLAN) wireless communications 110 may be vastly different. For example, the signal strength between Bluetooth wireless communications 108 and wireless local area network (WLAN) wireless communications 110 may be separated by up to 70 decibels (dB). In one configuration the Bluetooth wireless communications 108 received may have a much larger signal strength than the wireless local area network (WLAN) wireless communications 110 received. The wireless local area network (WLAN) wireless communications 110 may be undetectable in the composite signal 106 in this environment unless the wireless local area network (WLAN) wireless communications 110 are isolated. Likewise, the wireless local area network (WLAN) wireless communications 110 may have a much larger signal strength than the Bluetooth wireless communications 108, rendering the Bluetooth wireless communications 108 undetectable.

To concurrently receive Bluetooth wireless communications 108 and wireless local area network (WLAN) wireless communications 110, a wireless device 102a may use a switching amplification circuit 112. The switching amplification circuit 112 is discussed in further detail below in relation to FIG. 3. The switching amplification circuit 112 may determine amplification applied to the composite signal 106. For example, in one configuration, the switching amplification circuit 112 may output a first signal to a wireless local area network (WLAN) receiver input 114 and a second signal to a Bluetooth receiver input 120. Both the first signal output to the wireless local area network (WLAN) receiver input 114 and the second signal output to the Bluetooth receiver input 120 may be amplified versions of the composite signal 106. In one configuration, the first signal output to the wireless local area network (WLAN) receiver input 114 and the second signal output to the Bluetooth receiver input 120 may be the same amplified version of the composite signal 106. In another configuration, the first signal output to the wireless local area network (WLAN) receiver input 114 and the second signal output to the Bluetooth receiver input 120 may be differently amplified versions of the composite signal 106.

A wireless local area network (WLAN) receiver 116 may receive the first signal output to the wireless local area network (WLAN) receiver input 114. The wireless local area network (WLAN) receiver 116 may then decode the signal received via the wireless local area network (WLAN) receiver input 114 to obtain a wireless local area network (WLAN) signal 118.

A Bluetooth receiver 122 may receive the second signal output to the Bluetooth receiver input 120. The Bluetooth receiver 122 may then decode the signal received via the Bluetooth receiver input 120 to obtain a Bluetooth signal 124.

Figure 2:
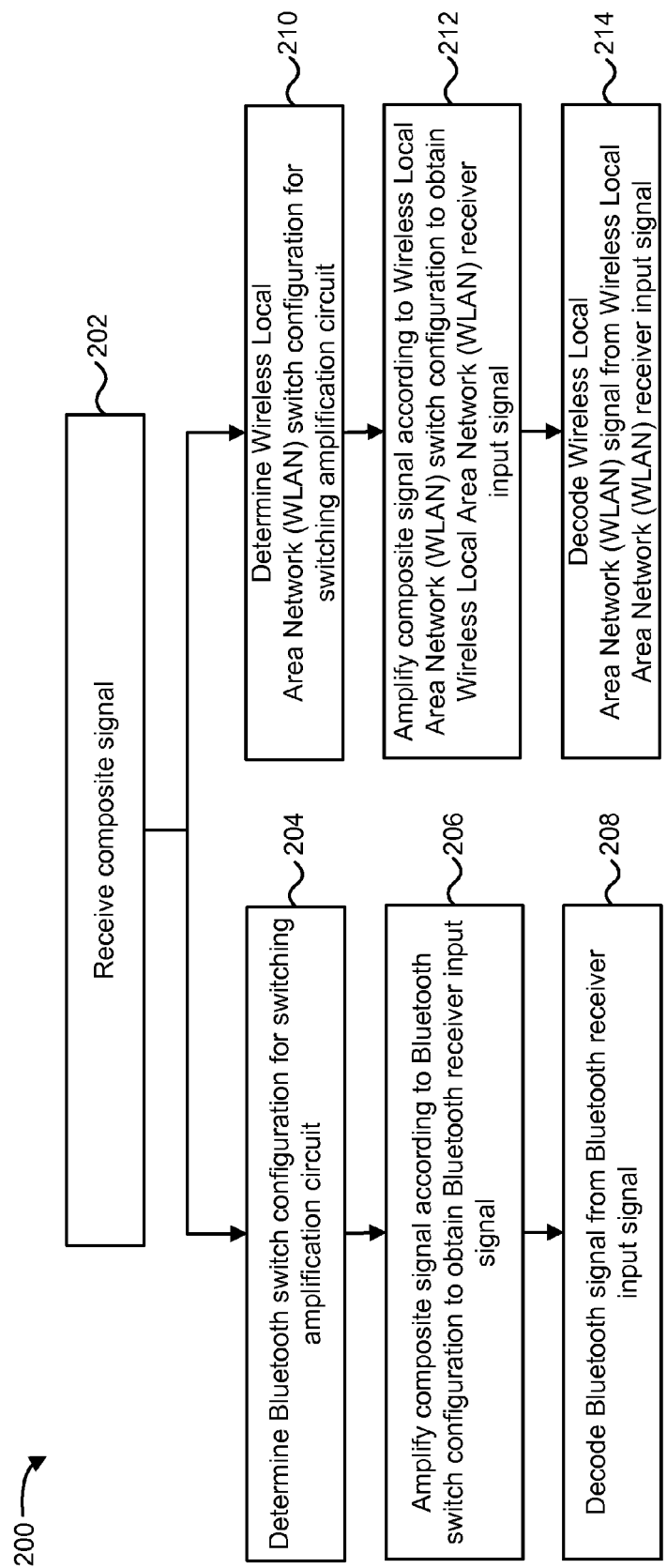
FIG. 2 is a flow diagram of a method for receiving Bluetooth wireless communications and wireless local area network (WLAN) wireless communications concurrently.

FIG. 2 is a flow diagram of a method 200 for receiving Bluetooth wireless communications 108 and wireless local area network (WLAN) wireless communications 110 concurrently. The method 200 may be performed by a wireless device 102a. In one configuration, the wireless device 102a may be a wireless communication device. The wireless device 102a may receive 202 a composite signal 106. The composite signal 106 may include Bluetooth wireless communications 108 and wireless local area network (WLAN) wireless communications 110. In other words, the composite signal 106 may include a Bluetooth wireless signal and a wireless local area network (WLAN) wireless signal. The wireless device 102a may use a single antenna 104 for receiving both the Bluetooth wireless signal and the wireless local area network (WLAN) wireless signal. The wireless device 102a may perform operations concerning the Bluetooth wireless signal while simultaneously performing operations concerning the wireless local area network (WLAN) wireless signal. In other words, steps 204-208 may be performed concurrently with steps 210-214.

The wireless device 102a may determine 204 a Bluetooth switch configuration for the switching amplification circuit 112. The Bluetooth switch configuration may refer to the position of a Bluetooth receiver input switch within the switching amplification circuit 112. The Bluetooth receiver input switch is discussed in additional detail below in relation to FIG. 4.

The wireless device 102a may then amplify 206 the composite signal 106 according to the Bluetooth switch configuration to obtain a Bluetooth receiver input signal. Depending on the input power level of the desired signal, the amplifier circuit may amplify or attenuate the composite signal 106. The Bluetooth receiver input signal may be an amplified version of the composite signal 106. The Bluetooth receiver input signal may be provided to a Bluetooth receiver 122 via a Bluetooth receiver input 120. The wireless device 102a may decode 208 a Bluetooth signal 124 from the Bluetooth receiver input signal using the Bluetooth receiver 122.

The wireless device 102a may also determine 210 a wireless local area network (WLAN) switch configuration for the switching amplification circuit 112. The wireless local area network (WLAN) switch configuration may refer to the position of a wireless local area network (WLAN) receiver input switch within the switching amplification circuit 112. The wireless local area network (WLAN) receiver input switch is discussed in additional detail below in relation to FIG. 4.

The wireless device 102a may amplify 212 the composite signal 106 according to the wireless local area network (WLAN) switch configuration to obtain a wireless local area network (WLAN) receiver input signal. The amplifier circuit may amplify or attenuate the composite signal 106 depending on the desired signal input power level. The wireless local area network (WLAN) receiver input signal may be an amplified version of the composite signal 106. The wireless local area network (WLAN) receiver input signal may be provided to a wireless local area network (WLAN) receiver 116 via a wireless local area network (WLAN) receiver input 114. The wireless device 102a may then decode 214 a wireless local area network (WLAN) signal 118 from the wireless local area network (WLAN) receiver input signal using the wireless local area network (WLAN) receiver 116.

Figure 3:
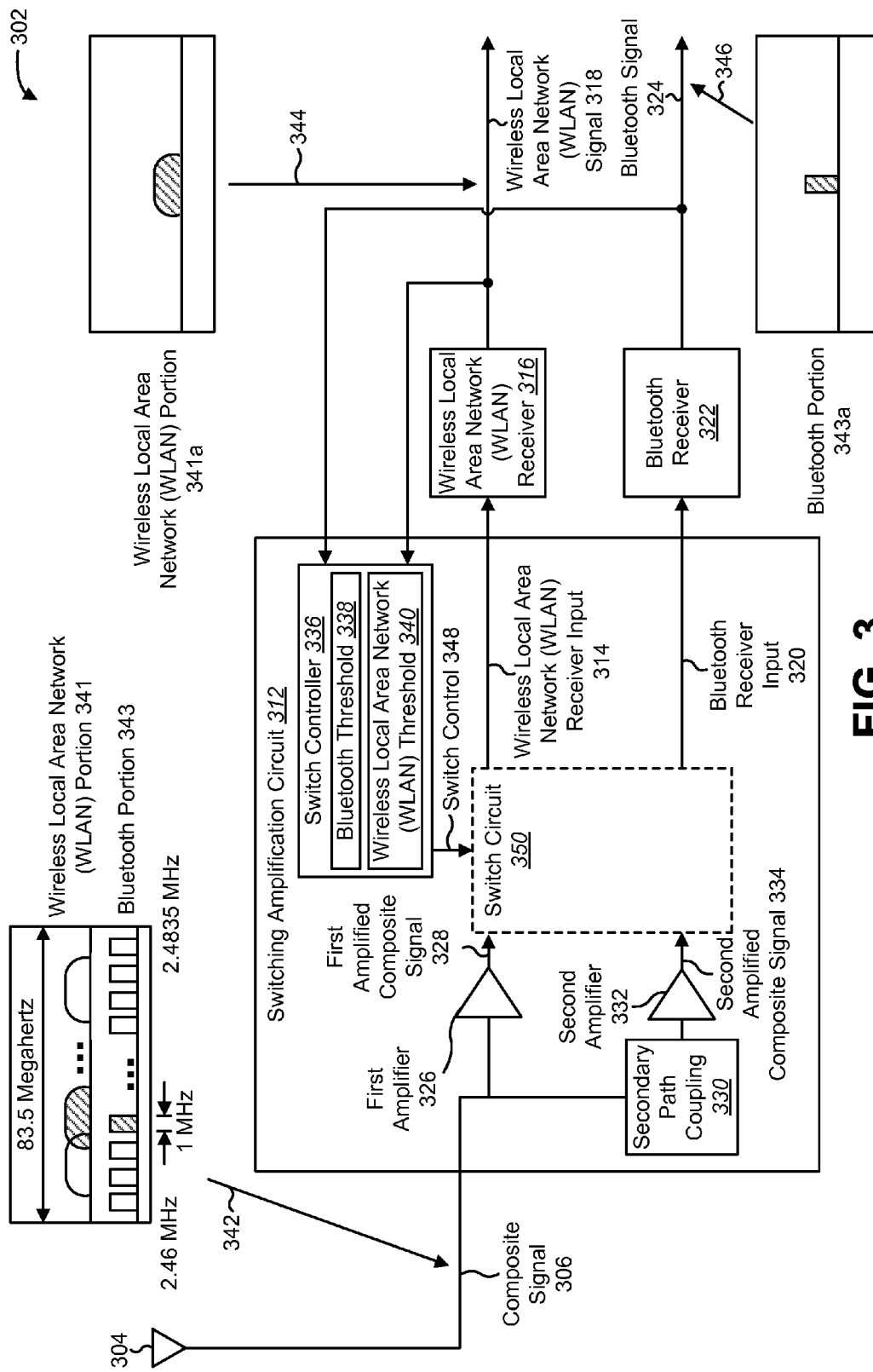
FIG. 3 is a block diagram illustrating various components of a wireless device for use in the present systems and methods.

FIG. 3 is a block diagram illustrating various components of a wireless device 302 for use in the present systems and methods. The wireless device 302 of FIG. 3 may be one configuration of the wireless device 102a of FIG. 1. The wireless device 302 may include a single antenna 304. The single antenna 304 may be used to receive both Bluetooth wireless communications 108 and wireless local area network (WLAN) wireless communications 110. A combination of received Bluetooth wireless communications 108 and wireless local area network (WLAN) wireless communications 110 may be referred to as a composite signal 306.

A graph 342 illustrating the composite signal 306 is shown. The composite signal 306 may include a wireless local area network (WLAN) portion 341 and a Bluetooth portion 343. Both the wireless local area network (WLAN) portion 341 and the Bluetooth portion 343 may be between the 2.4 GHz and 2.4835 GHz range. The wireless local area network (WLAN) portion 341 may include a 20 MHz or 40 MHz channel used. The Bluetooth portion 343 may include a 1 MHz channel used. The Bluetooth portion 343 and the wireless local area network (WLAN) portion 341 may overlap each other in the frequency spectrum. There may be no spectrum usage coordination between WLAN and Bluetooth. If a collision occurs (i.e., both protocols using the same spectrum at the same time) a retransmit may occur and that channel may be avoided in the future.

The Bluetooth wireless communications portion 343 and the wireless local area network (WLAN) wireless communications portion 341 may have substantially different signal strengths. For example, the Bluetooth wireless communications portion 343 and the wireless local area network (WLAN) wireless communications portion 341 may differ in signal strength by up to 70 dB.

The wireless device 302 may include a switching amplification circuit 312. The switching amplification circuit 312 of FIG. 3 may be one configuration of the switching amplification circuit 112 of FIG. 1. The switching amplification circuit 312 may include a first amplifier 326. The first amplifier 326 may be a low noise amplifier (LNA). The first amplifier 326 may receive the composite signal 306. The first amplifier 326 may then output a first amplified composite signal 328. The first amplified composite signal 328 may be an amplified version of the composite signal 306. The amount of LNA gain, the number and size of the gain steps and the level of attenuation are derived by the signal path gain line up from the RF input to an ADC in a receiver.

The switching amplification circuit 312 may include a secondary path coupling 330. The secondary path coupling 330 may have some loss without substantially degrading the performance or sensitivity of the first amplifier 326. The secondary path coupling 330 may include a passive device (such as a capacitor) or a combination of passive devices. The secondary path coupling 330 may also include an active device (such as a transistor) or a combination of active devices. The devices in the secondary path coupling 330 may be reconfigurable through a controller (not shown). The controller may control the amount of loss in the secondary path coupling 330. Thus, the amount of loss in the secondary path coupling 330 may be programmable. The devices in the secondary path coupling 330 may be controlled by control signals. The amount of loss in the secondary path coupling 330 may be programmed by the control signals.

The secondary path coupling 330 may be connected to a second amplifier 332. The second amplifier 332 may also be a low noise amplifier (LNA). The composite signal 306 may pass through the secondary path coupling 330 prior to being amplified by the second amplifier 332. The second amplifier 332 may then output a second amplified composite signal 334. The secondary path coupling 330 may reduce the signal strength of the composite signal 306 received by the second amplifier 332. In one configuration, the secondary path coupling 330 may reduce the signal strength of the composite signal 306 (by, for example, 15-20 dB). The secondary path coupling 330 may also increase the input impedance in the path from the antenna 304 to the second amplifier 332. Thus, most of the received signal power from the antenna 304 may go to the first amplifier 326, while a smaller portion of the received signal power from the antenna 304 may go to the second amplifier 332. The first amplified composite signal 328 may have approximately 15-20 dB more signal strength than the second amplified composite signal 334. Coupling approximately 15-20 dB from the primary path will degrade the primary path by <0.1 dB.

A switch circuit 350 may receive the first amplified composite signal 328 and the second amplified composite signal 334. The switch circuit 350 is discussed in further detail below in relation to FIG. 4. The switch circuit 350 may output a wireless local area network (WLAN) receiver input signal to a wireless local area network (WLAN) receiver input 314 and a Bluetooth receiver input signal to a Bluetooth receiver input 320. Both the wireless local area network (WLAN) receiver input signal and the Bluetooth receiver input signal may be amplified versions of the composite signal 306. In other words, both the wireless local area network (WLAN) receiver input signal and the Bluetooth receiver input signal may include the wireless local area network (WLAN) portion 341 and Bluetooth portion 343 of the composite signal 306. Depending on the configuration of the switch circuit 350, the wireless local area network (WLAN) receiver input signal may be either the first amplified composite signal 328 or the second amplified composite signal 334. Likewise, depending on the configuration of the switch circuit 350, the Bluetooth receiver input signal may be either the first amplified composite signal 328 or the second amplified composite signal 334.

The switch circuit 350 may be controlled by a switch controller 336 using a switch control 348. The switch controller 336 may be in either the analog portion or the baseband portion of the wireless device 102a. It is possible to detect either the Bluetooth signal level or the wireless local area network (WLAN) signal level after channel filtering. This can be done in the analog domain (meaning prior to digitization with an analog to digital converter (ADC)) or in the digital domain. In the analog domain, the desired channel may be down converted. After the analog channel filter, a signal power level estimation can be made with an analog detector. In the digital domain, detection of the signal level may be performed after the analog to digital converter (ADC).

The switch controller 336 may include a Bluetooth threshold 338 and a wireless local area network (WLAN) threshold 340. The Bluetooth threshold 338 and the wireless local area network (WLAN) threshold 340 may be preset values. The switch controller 336 may receive a wireless local area network (WLAN) signal 318 and a Bluetooth signal 324 as feedback. The switch controller 336 may compare the wireless local area network (WLAN) signal 318 with the wireless local area network (WLAN) threshold 340 to determine switch settings in the switch circuit 350. The switch controller 336 may also compare the Bluetooth signal 324 with the Bluetooth threshold 338 to determine switch settings in the switch circuit 350. The comparisons may compare the signal strength of each signal to determine which signal has a greater signal strength.

The wireless device 302 may include a wireless local area network (WLAN) receiver 316. The wireless local area network (WLAN) receiver 316 is discussed in additional detail below in relation to FIG. 4. The wireless local area network (WLAN) receiver 316 may receive the wireless local area network (WLAN) receiver input signal via the wireless local area network (WLAN) receiver input 314. The wireless local area network (WLAN) receiver 316 may then decode (i.e. filter, frequency adjust) the wireless local area network (WLAN) receiver input signal to obtain the desired wireless local area network (WLAN) signal 318. As discussed above, the wireless local area network (WLAN) signal 318 may be used as feedback to the switch controller 336. The wireless local area network (WLAN) signal 318 is illustrated in graph 344. The wireless local area network (WLAN) signal 318 may include the wireless local area network (WLAN) portion 341a of the composite signal 306 while excluding the Bluetooth portion 343 of the composite signal 306.

The wireless device 302 may also include a Bluetooth receiver 322. The Bluetooth receiver 322 is discussed in additional detail below in relation to FIG. 4. The Bluetooth receiver 322 may receive the Bluetooth receiver input signal via the Bluetooth receiver input 320. The Bluetooth receiver 322 may then decode the desired Bluetooth receiver input signal to obtain the Bluetooth signal 324. As discussed above, the Bluetooth signal 324 may be used as feedback to the switch controller 336. The Bluetooth signal 324 is illustrated in graph 346. The Bluetooth signal 324 may include the Bluetooth portion 343a of the composite signal 306 while excluding the wireless local area network (WLAN) portion 341 of the composite signal 306.

Figure 4:
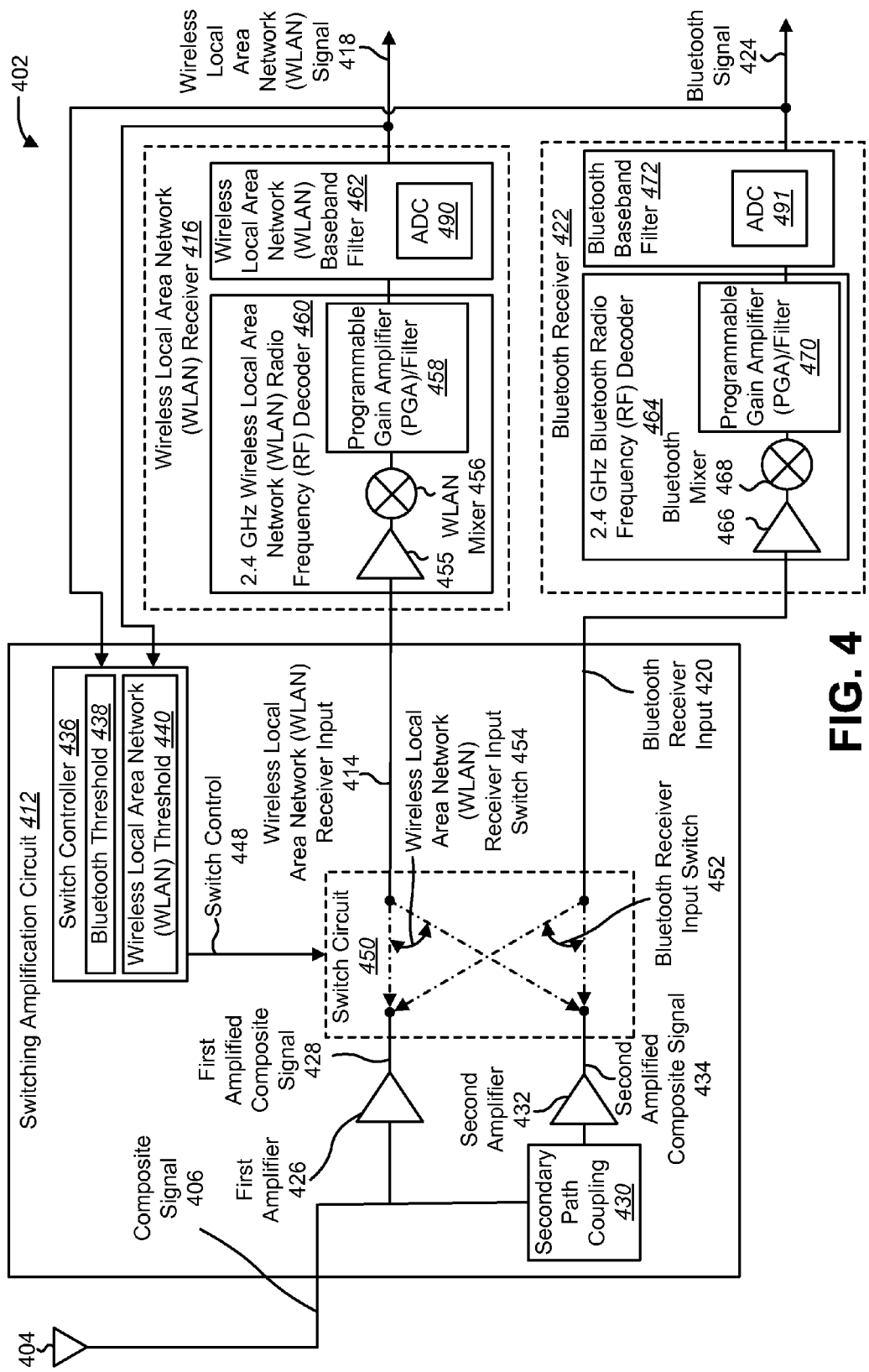
FIG. 4 is another block diagram illustrating various components of a wireless device for use in the present systems and methods.

FIG. 4 is another block diagram illustrating various components of a wireless device 402 for use in the present systems and methods. The wireless device 402 of FIG. 4 may be one configuration of the wireless device 102a of FIG. 1. The wireless device 402 may include a single antenna 404. The single antenna 404 may be used to receive a composite signal 406. The composite signal 406 may include both a wireless local area network (WLAN) portion and a Bluetooth portion. In other words, the antenna 404 may simultaneously receive both wireless local area network (WLAN) wireless signals and Bluetooth wireless signals.

The composite signal 406 may be provided to a switching amplification circuit 412. The switching amplification circuit 412 may include a first amplifier 426. In one configuration, the first amplifier 426 may be a low noise amplifier (LNA). The first amplifier 426 may amplify the composite signal 406 to obtain a first amplified composite signal 428. The switching amplification circuit 412 may also include a second amplifier 432. In one configuration, the second amplifier 432 may be a low noise amplifier (LNA). The switching amplification circuit 412 may provide the composite signal 406 to the second amplifier 432 via a secondary path coupling 430. As discussed above, the secondary path coupling 430 may include active and/or passive devices. In one configuration, the secondary path coupling 430 may provide a signal strength deficit of approximately 15-20 dB. The second amplifier 432 may then amplify the attenuated version of the composite signal 406 to obtain a second amplified composite signal 434.

The first amplified composite signal 428 and the second amplified composite signal 434 may be provided to a switch circuit 450. The switch circuit 450 may include a wireless local area network (WLAN) receiver input switch 454 and a Bluetooth receiver input switch 452. The wireless local area network (WLAN) receiver input switch 454 may connect a wireless local area network (WLAN) receiver input 414 to either the first amplified composite signal 428 or the second amplified composite signal 434. Likewise, the Bluetooth receiver input switch 452 may connect a Bluetooth receiver input 420 to either the first amplified composite signal 428 or the second amplified composite signal 434. The wireless local area network (WLAN) receiver input switch 454 and the Bluetooth receiver input switch 452 may operate independently of each other.

The switch circuit 450 may be controlled by a switch controller 436 via a switch control 448. The switch controller 436 may control the wireless local area network (WLAN) receiver input switch 454 and the Bluetooth receiver input switch 452. The switch controller 436 may adjust the wireless local area network (WLAN) receiver input switch 454 and the Bluetooth receiver input switch 452 continuously or periodically. For example, in one configuration, the switch controller 436 may adjust the wireless local area network (WLAN) receiver input switch 454 and the Bluetooth receiver input switch 452 only during a training period.

The switch controller 436 may receive a feedback wireless local area network (WLAN) signal 418. The switch controller 436 may then compare the received feedback wireless local area network (WLAN) signal 418 with a wireless local area network (WLAN) threshold 440. The wireless local area network (WLAN) threshold 440 may be a preset value. If the feedback wireless local area network (WLAN) signal 418 is greater than the wireless local area network (WLAN) threshold 440, the switch controller 436 may adjust the wireless local area network (WLAN) receiver input switch 454 to connect the wireless local area network (WLAN) receiver input 414 to the second amplified composite signal 434. If the feedback wireless local area network (WLAN) signal 418 is less than the wireless local area network (WLAN) threshold 440, the switch controller 436 may adjust the wireless local area network (WLAN) receiver input switch 454 to connect the wireless local area network (WLAN) receiver input 414 to the first amplified composite signal 428.

The switch controller 436 may receive a feedback Bluetooth signal 424. The switch controller 436 may then compare the received feedback Bluetooth signal 424 with a Bluetooth threshold 438. The Bluetooth threshold 438 may be a preset value. If the feedback Bluetooth signal 424 is greater than the Bluetooth threshold 438, the switch controller 436 may adjust the Bluetooth receiver input switch 452 to connect the Bluetooth receiver input 420 to the second amplified composite signal 434. If the feedback Bluetooth signal 424 is less than the Bluetooth threshold 438, the switch controller 436 may adjust the Bluetooth receiver input switch 452 to connect the Bluetooth receiver input 420 to the first amplified composite signal 428.

The wireless device 402 may include a wireless local area network (WLAN) receiver 416. The wireless local area network (WLAN) receiver 416 may receive the wireless local area network (WLAN) receiver input signal from the switch circuit 450. The wireless local area network (WLAN) receiver 416 may include a 2.4 GHz wireless local area network (WLAN) radio frequency (RF) decoder 460. The 2.4 GHz wireless local area network (WLAN) radio frequency (RF) decoder 460 may include a low noise amplifier (LNA) 455, a wireless local area network (WLAN) mixer 456 and a programmable gain amplifier (PGA)/filter 458. The mixer 456 may downconvert the desired frequency of the wireless local area network (WLAN) received input signal. The output of the 2.4 GHz wireless local area network (WLAN) radio frequency (RF) decoder 460 may be passed through a wireless local area network (WLAN) baseband filter 462 to obtain the wireless local area network (WLAN) signal 418. The wireless local area network (WLAN) baseband filter 462 may include an analog to digital converter (ADC) 490. The wireless local area network (WLAN) signal 418 may be fed back to the switch controller 436.

The wireless device 402 may also include a Bluetooth receiver 422. The Bluetooth receiver 422 may receive the Bluetooth receiver input signal from the switch circuit 450. The Bluetooth receiver 422 may include a 2.4 GHz Bluetooth radio frequency (RF) decoder 464. The 2.4 GHz Bluetooth radio frequency (RF) decoder 464 may include a low noise amplifier (LNA) 466, a Bluetooth mixer 468, and a programmable gain amplifier (PGA)/filter 470. The Bluetooth receiver input signal may be passed through the 2.4 GHz Bluetooth radio frequency (RF) decoder 464 and then filtered using a Bluetooth baseband filter 472 to obtain a Bluetooth signal 424. The Bluetooth baseband filter 472 may include an analog to digital converter (ADC) 491. The Bluetooth signal 424 may be fed back to the switch controller 436.

Figure 5:
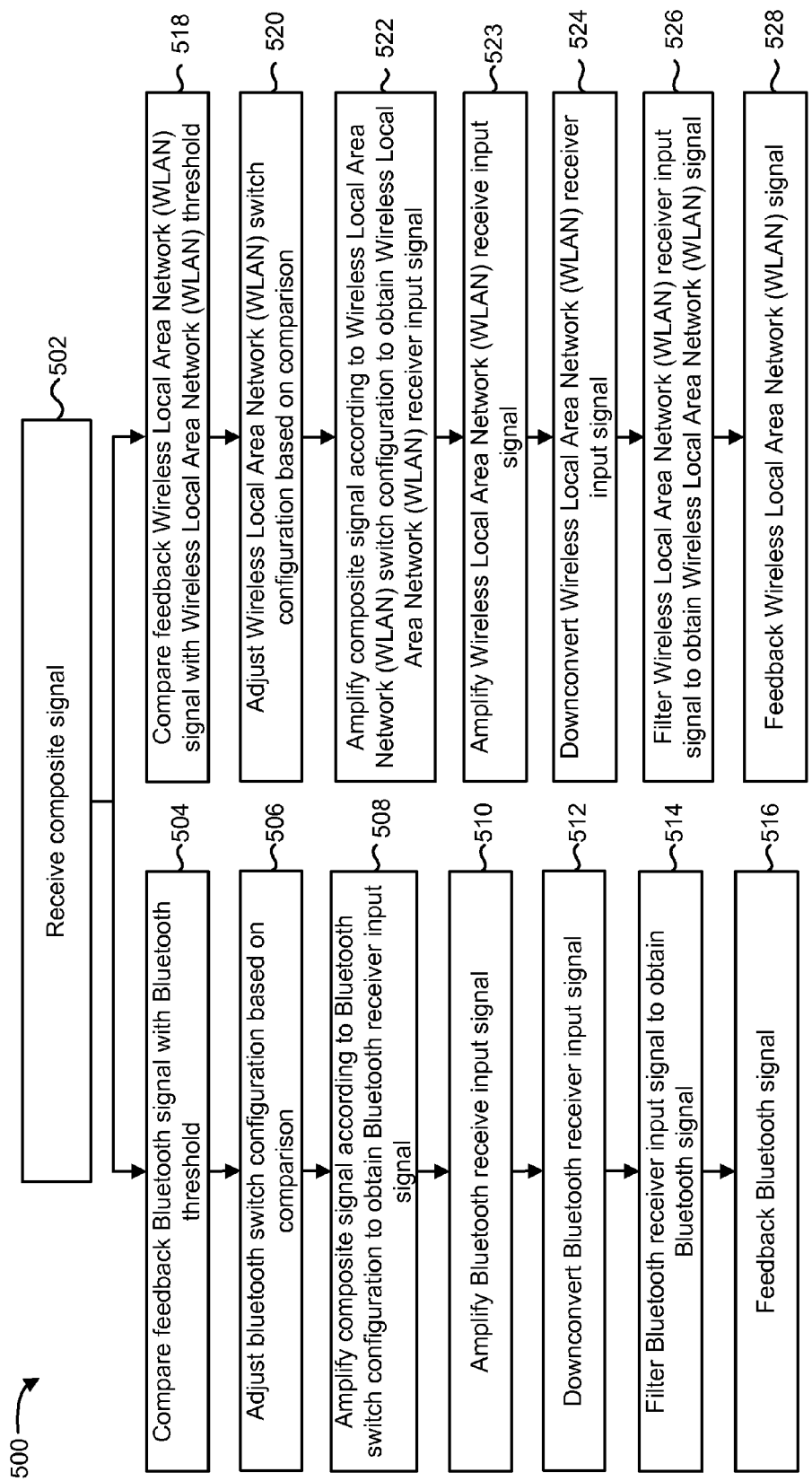
FIG. 5 is a flow diagram of another method for receiving a Bluetooth wireless signal and a wireless local area network (WLAN) wireless signal concurrently.

FIG. 5 is a flow diagram of another method 500 for receiving a Bluetooth wireless signal and a wireless local area network (WLAN) wireless signal concurrently. The method 500 may be performed by a wireless device 402. For example, the method 500 may be performed by a wireless communication device or a base station. The wireless device 402 may receive 502 a composite signal 406. The composite signal 406 may be received using a single antenna 404. The wireless device 402 may perform decoding steps to obtain the desired Bluetooth signal 424 from the composite signal 406 while simultaneously performing decoding steps to obtain a wireless local area network (WLAN) signal 418 from the composite signal 406. In other words, steps 504-516 may be performed concurrently with steps 518-528.

The wireless device 402 may compare 504 a feedback Bluetooth signal 424 with a Bluetooth threshold 438. The wireless device 402 may adjust 506 a Bluetooth switch configuration based on the comparison between the feedback Bluetooth signal 424 and the Bluetooth threshold 438. The Bluetooth switch configuration may refer to the position of one or more switches in a switch circuit 450. For example, the Bluetooth switch configuration may refer to the position of a Bluetooth receiver input switch 452. The wireless device 402 may amplify 508 the composite signal 406 according to the Bluetooth switch configuration to obtain a Bluetooth receiver input signal. As discussed above, the Bluetooth receiver input signal may be an amplified version of the composite signal 406.

The wireless device 402 may amplify 510 the Bluetooth receiver input signal using a low noise amplifier (LNA) 466. The wireless device 402 may also downconvert 512 the frequency of the Bluetooth receiver input signal using a Bluetooth mixer 468. The wireless device 402 may also filter 514 the Bluetooth receiver input signal to obtain a Bluetooth signal 424. The wireless device 402 may feedback 516 the Bluetooth signal 424 to the switch controller 436.

The wireless device 402 may compare 518 a feedback wireless local area network (WLAN) signal 418 with a wireless local area network (WLAN) threshold 440. The wireless device 402 may adjust 520 a wireless local area network (WLAN) switch configuration based on the comparison between the feedback wireless local area network (WLAN) signal 418 and the wireless local area network (WLAN) threshold 440. The wireless local area network (WLAN) switch configuration may refer to the position of one or more switches in a switch circuit 450. For example, the wireless local area network (WLAN) switch configuration may refer to the position of a wireless local area network (WLAN) receiver input switch 454. The wireless device 402 may amplify 522 the composite signal 406 according to the wireless local area network (WLAN) switch configuration to obtain a wireless local area network (WLAN) receiver input signal. As discussed above, the wireless local area network (WLAN) receiver input signal may be an amplified version of the composite signal 406.

The wireless device 402 may amplify 523 the wireless local area network (WLAN) receiver input signal using a low noise amplifier (LNA) 455. The wireless device 402 may then downconvert 524 the wireless local area network (WLAN) receiver input signal using a wireless local area network (WLAN) mixer 456. The wireless device 402 may also filter 526 the wireless local area network (WLAN) receiver input signal to obtain a wireless local area network (WLAN) signal 418. The wireless device 402 may feedback 528 the wireless local area network (WLAN) signal 418 to the switch controller 436.

Figure 6:
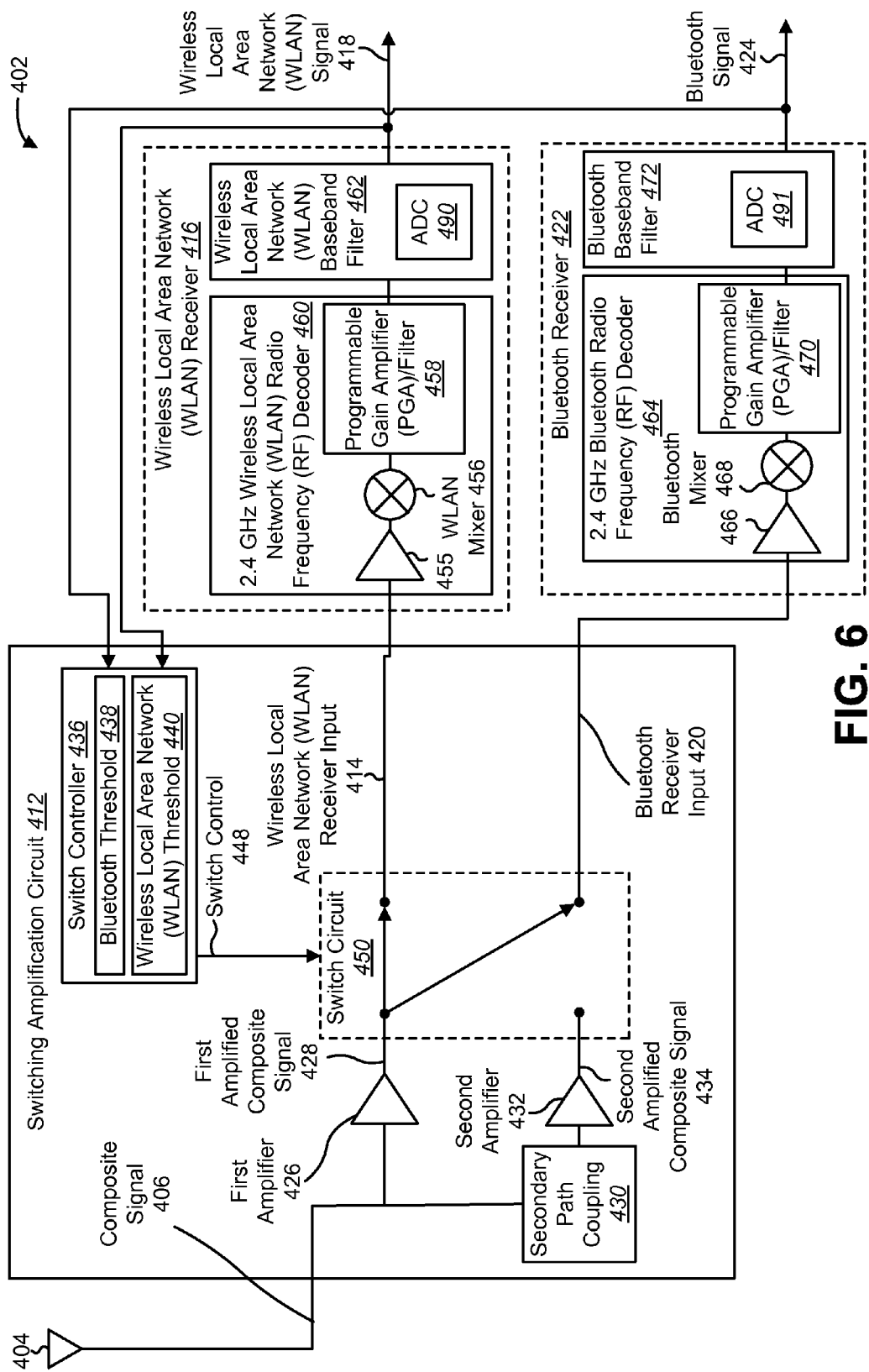
FIG. 6 is a block diagram illustrating a first state of a wireless device corresponding to a weak Bluetooth signal and a weak wireless local area network (WLAN) signal.

FIG. 6 is a block diagram illustrating a first state of a wireless device 402 corresponding to a weak Bluetooth signal 424 and a weak wireless local area network (WLAN) signal 418. The wireless device 402 in FIG. 6 is the same wireless device 402 as illustrated in FIG. 4. As discussed above in relation to FIG. 4, the wireless device 402 may include a switching amplification circuit 412 that includes a switch circuit 450. The switch circuit 450 may include a Bluetooth receiver input switch 452 and a wireless local area network (WLAN) receiver input switch 454.

The Bluetooth receiver input switch 452 may connect the Bluetooth receiver input 420 signal to either the first amplified composite signal 428 or the second amplified composite signal 434. The feedback Bluetooth signal 424 may be less than the Bluetooth threshold 438 in the switch controller 436. Therefore, in the first state, the Bluetooth receiver input switch 452 may connect the Bluetooth receiver input 420 to the output of the first amplifier 426. Thus, the Bluetooth receiver 422 may receive the first amplified composite signal 428.

The wireless local area network (WLAN) receiver input switch 454 may connect the wireless local area network (WLAN) receiver input 414 to either the first amplified composite signal 428 or the second amplified composite signal 434. The feedback wireless local area network (WLAN) signal 418 may be less than the wireless local area network (WLAN) threshold 440 in the switch controller 436. Therefore, in the first state, the wireless local area network (WLAN) receiver input switch 454 may connect the wireless local area network (WLAN) receiver input 414 to the output of the first amplifier 426. Thus, the wireless local area network (WLAN) receiver 416 may receive the first amplified composite signal 428.

Due to the positions of the Bluetooth receiver input switch 452 and the wireless local area network (WLAN) receiver input switch 454, the output of the second amplifier 432 in the first state is not connected to anything. In other words, in the first state, the second amplifier 432 does not amplify the composite signal 406.

Figure 7:
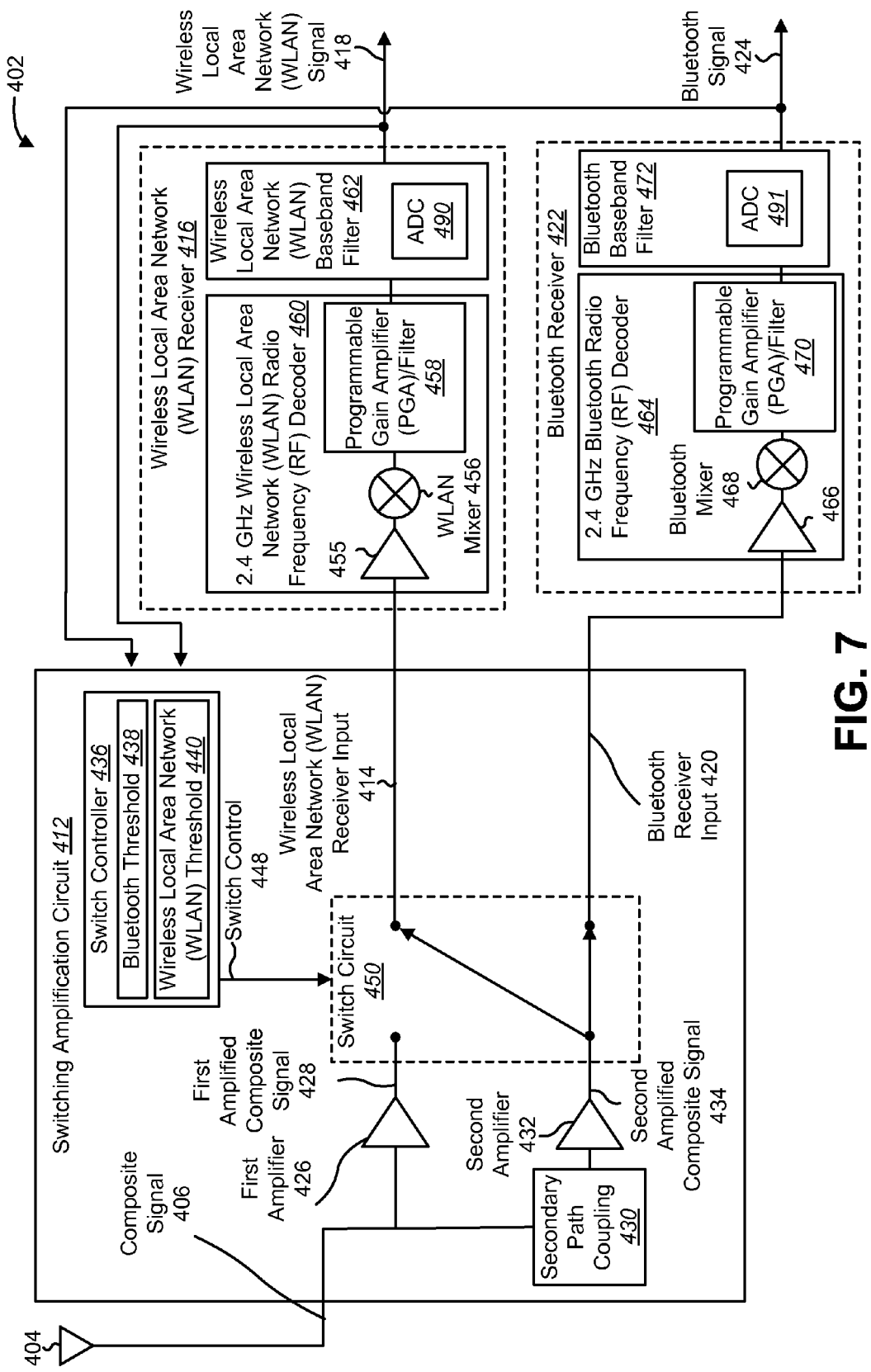
FIG. 7 is a block diagram illustrating a second state of a wireless device corresponding to a strong Bluetooth signal and a strong wireless local area network (WLAN) signal.

FIG. 7 is a block diagram illustrating a second state of a wireless device 402 corresponding to a strong Bluetooth signal 424 and a strong wireless local area network (WLAN) signal 418. The wireless device 402 in FIG. 7 is the same wireless device 402 as illustrated in FIG. 4. The feedback Bluetooth signal 424 may be greater than the Bluetooth threshold 438 in the switch controller 436. Therefore, in the second state, the Bluetooth receiver input switch 452 may connect the Bluetooth receiver input 420 to the output of the second amplifier 434. Thus, the Bluetooth receiver 422 may receive the second amplified composite signal 434.

The feedback wireless local area network (WLAN) signal 418 may be greater than the wireless local area network (WLAN) threshold 440. Therefore, in the second state, the wireless local area network (WLAN) receiver input switch 454 may connect the wireless local area network (WLAN) receiver input 414 to the output of the second amplifier 434. Thus, the wireless local area network (WLAN) receiver 416 may receive the second amplified composite signal 434.

Due to the positions of the Bluetooth receiver input switch 452 and the wireless local area network (WLAN) receiver input switch 454, the output of the first amplifier 426 in the second state is not connected to anything. In other words, in the second state, the first amplifier 426 does not amplify the composite signal 406.

The use of the second amplified composite signal 434 (and thus the use of the secondary path coupling 430) may reduce the signal strength of the composite signal 406 received by the antenna 404 so that the reduced signal does not saturate the downstream receive path. As the signal is filtered and amplified, the signal level is in the optimal range for analog to digital (ADC) digitization.

Figure 8:
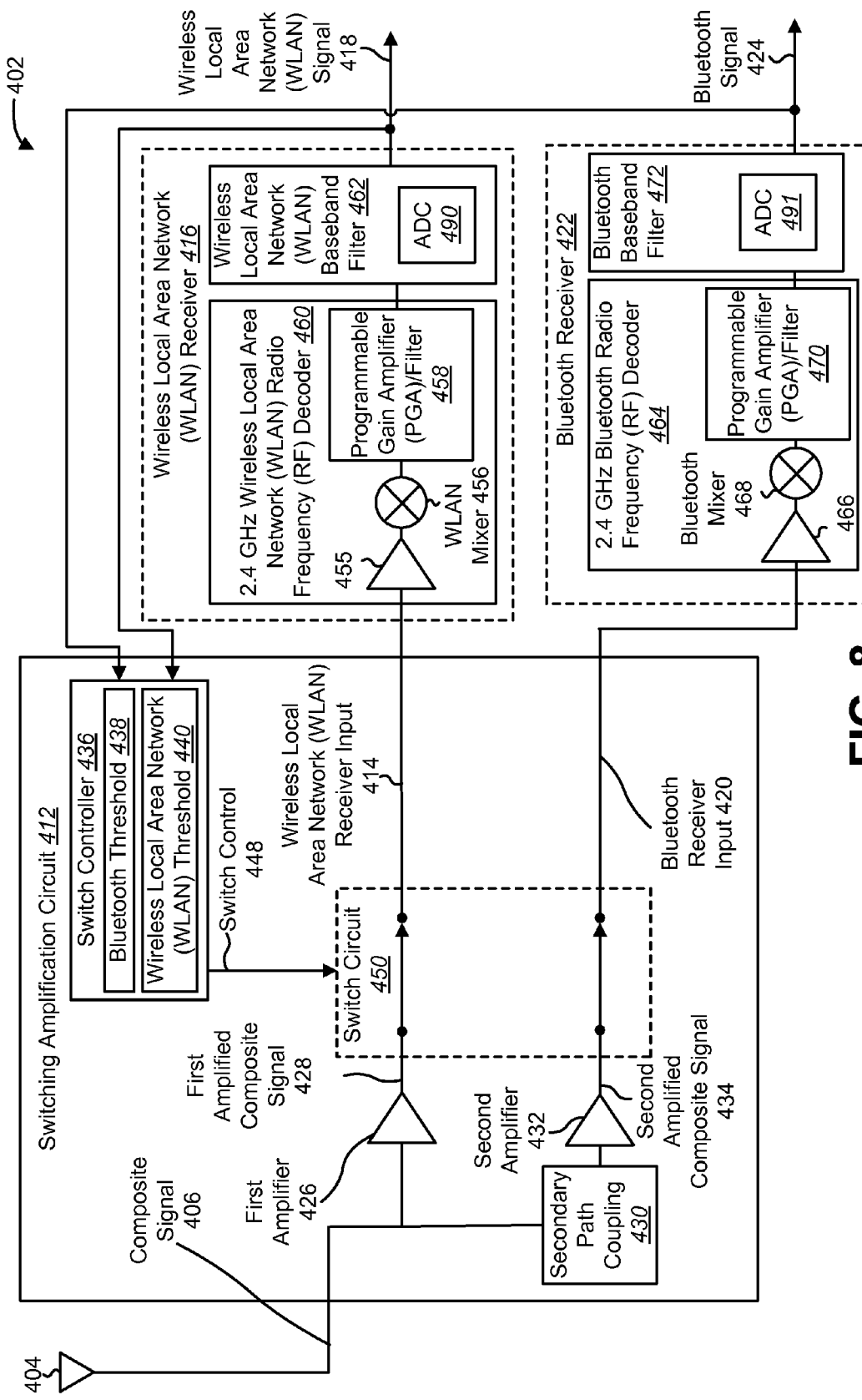
FIG. 8 is a block diagram illustrating a third state of a wireless device corresponding to a strong Bluetooth signal and a weak wireless local area network (WLAN) signal.

FIG. 8 is a block diagram illustrating a third state of a wireless device 402 corresponding to a strong Bluetooth signal 424 and a weak wireless local area network (WLAN) signal 418. The wireless device 402 in FIG. 8 is the same wireless device 402 as illustrated in FIG. 4. The feedback Bluetooth signal 424 may be greater than the Bluetooth threshold 438 in the switch controller 436. Therefore, in the third state, the Bluetooth receiver input switch 452 may connect the Bluetooth receiver input 420 to the output of the second amplifier 432. Thus, the Bluetooth receiver 422 may receive the second amplified composite signal 434.

The feedback wireless local area network (WLAN) signal 418 may be less than the wireless local area network (WLAN) threshold 440. Therefore, in the third state, the wireless local area network (WLAN) receiver input switch 454 may connect the wireless local area network (WLAN) receiver input 414 to the output of the first amplifier 426. Thus, the wireless local area network (WLAN) receiver 416 may receive the first amplified composite signal 428.

Figure 9:
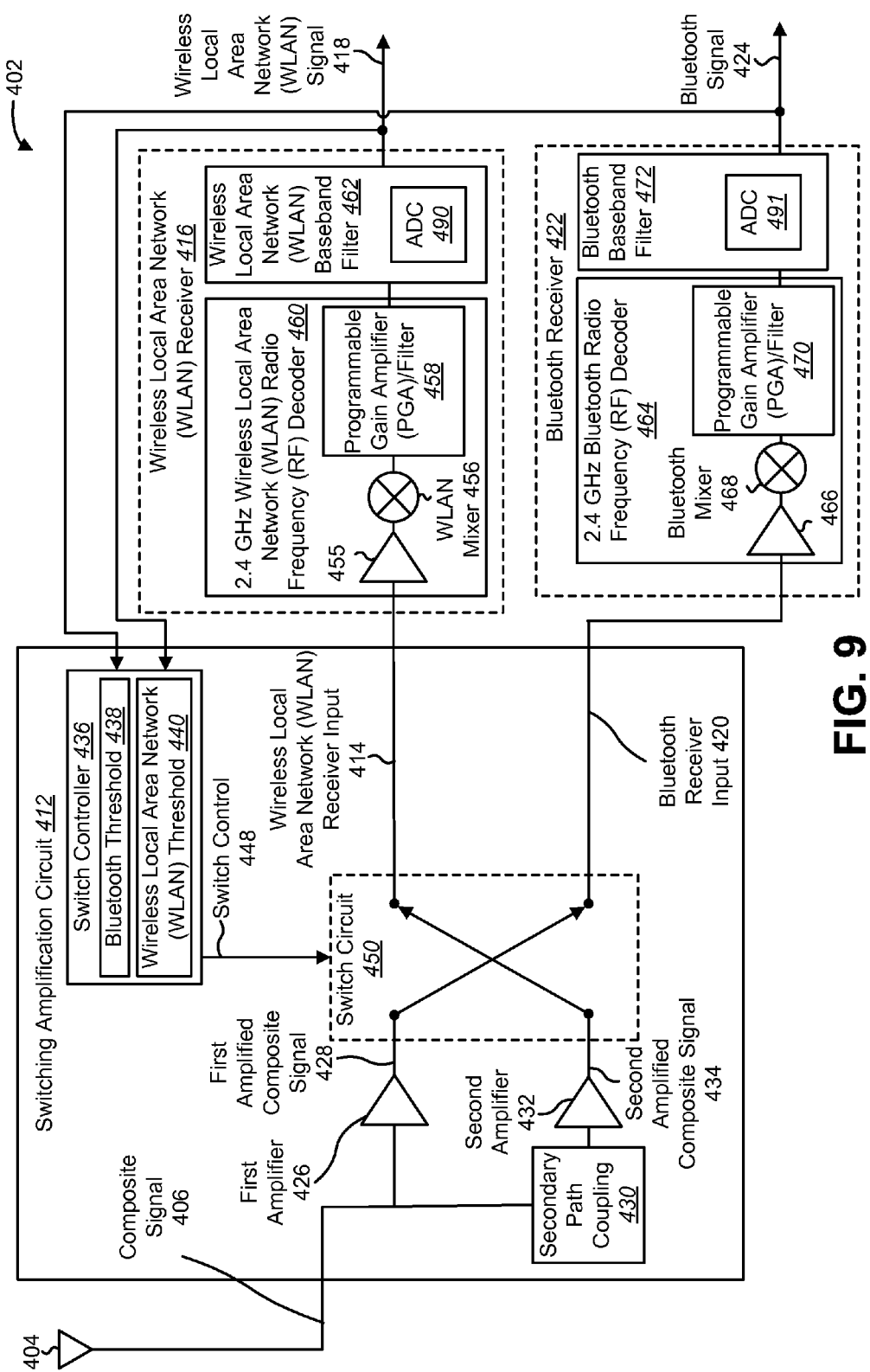
FIG. 9 is a block diagram illustrating a fourth state of a wireless device corresponding to a weak Bluetooth signal and a strong wireless local area network (WLAN) signal.

FIG. 9 is a block diagram illustrating a fourth state of a wireless device 402 corresponding to a weak Bluetooth signal 424 and a strong wireless local area network (WLAN) signal 418. The wireless device 402 in FIG. 9 is the same wireless device 402 as illustrated in FIG. 4. The feedback Bluetooth signal 424 may be less than the Bluetooth threshold 438 in the switch controller 436. Therefore, in the fourth state, the Bluetooth receiver input switch 452 may connect the Bluetooth receiver input 420 to the output of the first amplifier 426. Thus, the Bluetooth receiver 422 may receive the first amplified composite signal 428.

The feedback wireless local area network (WLAN) signal 418 may be greater than the wireless local area network (WLAN) threshold 440. Therefore, in the fourth state, the wireless local area network (WLAN) receiver input switch 454 may connect the wireless local area network (WLAN) receiver input 414 to the output of the second amplifier 432. Thus, the wireless local area network (WLAN) receiver 416 may receive the second amplified composite signal 434.

Figure 10:
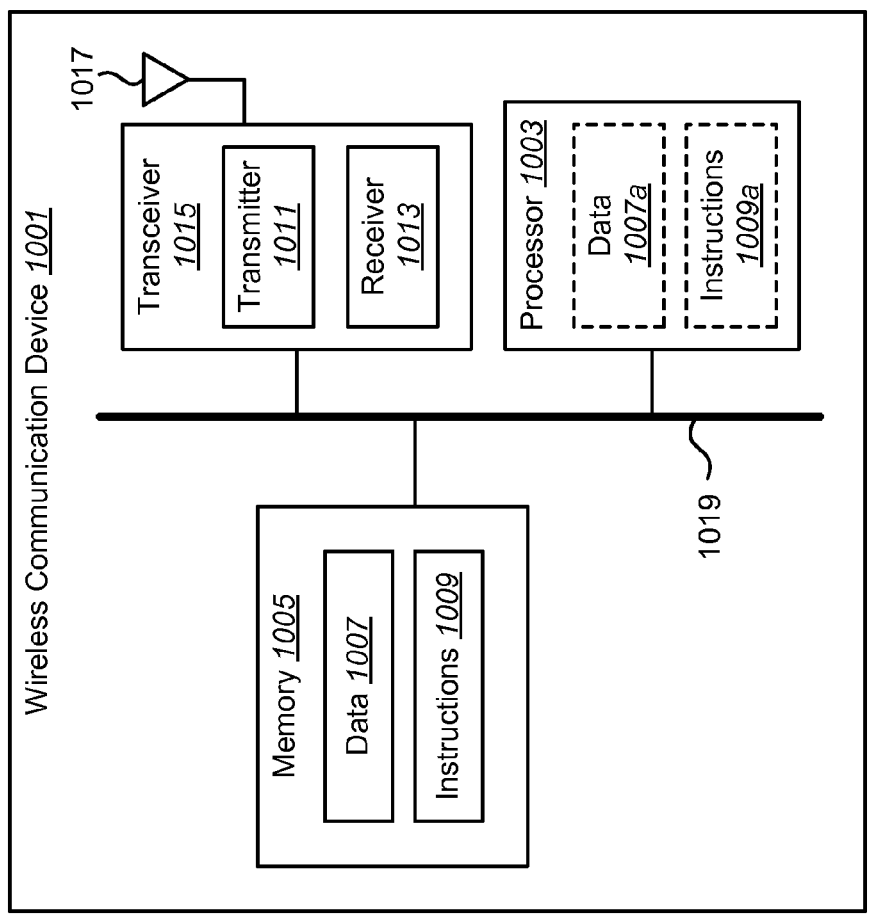
FIG. 10 illustrates certain components that may be included within a wireless communication device.

FIG. 10 illustrates certain components that may be included within a wireless communication device 1001. The wireless communication device 1001 may be an access terminal, a mobile station, a user equipment (UE), etc. The wireless communication device 1001 includes a processor 1003. The processor 1003 may be a general purpose single- or multi-chip microprocessor (e.g., an ARM), a special purpose microprocessor (e.g., a digital signal processor (DSP)), a microcontroller, a programmable gate array, etc. The processor 1003 may be referred to as a central processing unit (CPU). Although just a single processor 1003 is shown in the wireless communication device 1001 of FIG. 10, in an alternative configuration, a combination of processors (e.g., an ARM and DSP) could be used.

The wireless communication device 1001 also includes memory 1005. The memory 1005 may be any electronic component capable of storing electronic information. The memory 1005 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1007 and instructions 1009 may be stored in the memory 1005. The instructions 1009 may be executable by the processor 1003 to implement the methods disclosed herein. Executing the instructions 1009 may involve the use of the data 1007 that is stored in the memory 1005. When the processor 1003 executes the instructions 1009, various portions of the instructions 1009a may be loaded onto the processor 1003, and various pieces of data 1007a may be loaded onto the processor 1003.

The wireless communication device 1001 may also include a transmitter 1011 and a receiver 1013 to allow transmission and reception of signals to and from the wireless communication device 1001. The transmitter 1011 and receiver 1013 may be collectively referred to as a transceiver 1015. An antenna 1017 may be electrically coupled to the transceiver 1015. The wireless communication device 1001 may also include (not shown) multiple transmitters, multiple receivers, multiple transceivers and/or multiple antenna.

The various components of the wireless communication device 1001 may be coupled together by one or more buses, which may include a power bus, a control signal bus, a status signal bus, a data bus, etc. For the sake of clarity, the various buses are illustrated in FIG. 10 as a bus system 1019.

Figure 11:
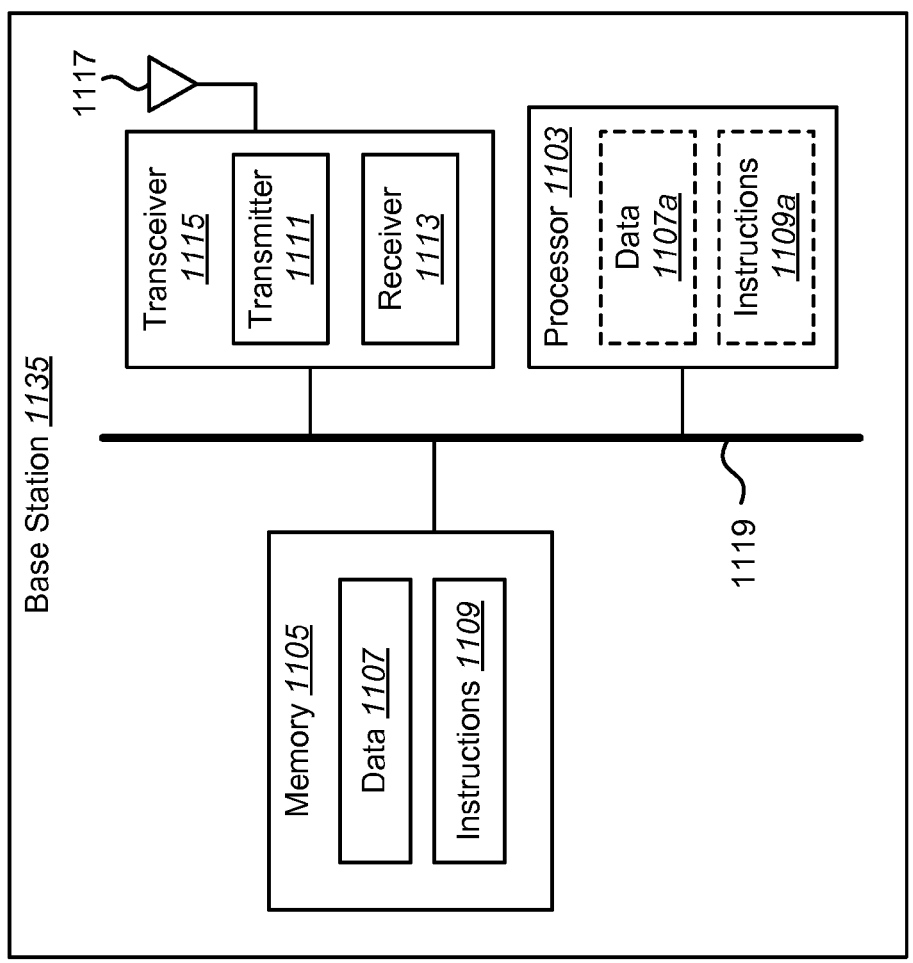
FIG. 11 illustrates certain components that may be included within a base station.

FIG. 11 illustrates certain components that may be included within a base station 1135. The base station 1135 includes a processor 1103. The processor 1103 may be a general purpose single- or multi-chip microprocessor (e.g., an ARM), a special purpose microprocessor (e.g., a digital signal processor (DSP)), a microcontroller, a programmable gate array, etc. The processor 1103 may be referred to as a central processing unit (CPU). Although just a single processor 1103 is shown in the base station 1135 of FIG. 11, in an alternative configuration, a combination of processors (e.g., an ARM and DSP) could be used.

The base station 1135 also includes memory 1105. The memory 1105 may be any electronic component capable of storing electronic information. The memory 1105 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1107 and instructions 1109 may be stored in the memory 1105. The instructions 1109 may be executable by the processor 1103 to implement the methods disclosed herein. Executing the instructions 1109 may involve the use of the data 1107 that is stored in the memory 1105. When the processor 1103 executes the instructions 1109, various portions of the instructions 1109a may be loaded onto the processor 1103, and various pieces of data 1107a may be loaded onto the processor 1103.

The base station 1135 may also include a transmitter 1111 and a receiver 1113 to allow transmission and reception of signals to and from the base station 1135. The transmitter 1111 and receiver 1113 may be collectively referred to as a transceiver 1115. An antenna 1117 may be electrically coupled to the transceiver 1115. The base station 1135 may also include (not shown) multiple transmitters, multiple receivers, multiple transceivers and/or multiple antenna.

The various components of the base station 1135 may be coupled together by one or more buses, which may include a power bus, a control signal bus, a status signal bus, a data bus, etc. For the sake of clarity, the various buses are illustrated in FIG. 11 as a bus system 1119.

The term "coupled" encompasses a wide variety of connections. For example, the term "coupled" should be interpreted broadly to encompass circuit elements directly connected to each other and circuit elements indirectly connected via other circuit elements.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The terms "computer-readable medium" or "computer-program product" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 2 and 5, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A wireless device for receiving composite signals comprising:
   an antenna;
   a first amplifier coupled to the antenna;
   a second amplifier coupled to the antenna;
   a first receiver, wherein an input of the first receiver is switched between an output of the first amplifier and an output of the second amplifier via a first switch; and
   a second receiver, wherein an input of the second receiver is switched between the output of the first amplifier and the output of the second amplifier via a second switch.

2. The wireless device of claim 1, further comprising a coupling between the antenna and the second amplifier, wherein the coupling has some receive signal power loss without degrading performance or sensitivity of the first amplifier.

3. The wireless device of claim 2, wherein the coupling comprises one or more passive devices and/or active devices.

4. The wireless device of claim 3, wherein the passive devices and/or active devices are reconfigurable through a controller, and wherein an amount of loss in the coupling is programmable.

5. The wireless device of claim 3, wherein the passive devices and/or active devices are controlled by control signals, and wherein an amount of the loss is programmed by the control signals.

6. The wireless device of claim 1, further comprising a switch controller, wherein the switch controller controls the first switch and the second switch.

7. The wireless device of claim 6, wherein the switch controller is in either an analog portion or a baseband portion.

8. The wireless device of claim 6, wherein the switch controller is programmable.

9. The wireless device of claim 8, wherein a composite signal comprises a first wireless signal based on a first wireless standard and a second wireless signal based on a second wireless standard in a same signal band.

10. The wireless device of claim 9, wherein the first wireless signal is a Bluetooth signal and the second wireless signal is a wireless local area network (WLAN) signal, and wherein the first receiver is a WLAN receiver and the second receiver is a Bluetooth receiver.

11. The wireless device of claim 10, wherein the switch controller is coupled to an output of the WLAN receiver, wherein the output of the WLAN receiver is compared with a WLAN threshold, and wherein the first switch couples the WLAN receiver to the output of the first amplifier when the output of the WLAN receiver is less than the WLAN threshold.

12. The wireless device of claim 10, wherein the switch controller is coupled to an output of the WLAN receiver, wherein the output of the WLAN receiver is compared with a WLAN threshold, and wherein the first switch couples the WLAN receiver to the output of the second amplifier when the output of the WLAN receiver is greater than the WLAN threshold.

13. The wireless device of claim 10, wherein the switch controller is coupled to an output of the Bluetooth receiver, wherein the output of the Bluetooth receiver is compared to a Bluetooth threshold, and wherein the second switch couples the Bluetooth receiver to the output of the first amplifier when the output of the Bluetooth receiver is less than the Bluetooth threshold.

14. The wireless device of claim 10, wherein the switch controller is coupled to an output of the Bluetooth receiver, wherein the output of the Bluetooth receiver is compared to a Bluetooth threshold, and wherein the second switch couples the Bluetooth receiver to the output of the second amplifier when the output of the Bluetooth receiver is greater than the Bluetooth threshold.

15. The wireless device of claim 10, wherein the WLAN receiver comprises;
   a WLAN decoder comprising a low noise amplifier (LNA), a mixer, a programmable gain amplifier (PGA) and a filter; and
   a baseband filter comprising an analog to digital converter (ADC).

16. The wireless device of claim 10, wherein the Bluetooth receiver comprises:
   a Bluetooth decoder comprising a low noise amplifier (LNA), a mixer, a programmable gain amplifier and a filter; and
   a baseband filter comprising an analog to digital converter (ADC).

17. A method for receiving a composite signal using an antenna, the method comprising:
   determining a first switch setting for a first portion of the composite signal;
   obtaining a first receiver input signal by amplifying the composite signal;
   decoding a first signal from the first receiver input signal using a first receiver;
   determining a second switch setting for a second portion of the composite signal;
   obtaining a second receiver input signal by amplifying the composite signal; and
   decoding a second signal from the second receiver input signal using a second receiver,
      wherein an input of the first receiver is switched between an output of a first amplifier and an output of a second amplifier based on the first switch setting of a first switch, and wherein an input of the second receiver is switched between the output of the first amplifier and the output of the second amplifier based on the second switch setting of a second switch.

18. The method of claim 17, wherein the composite signal comprises a Bluetooth signal and a wireless local area network (WLAN) signal, and wherein the first receiver is a WLAN receiver and the second receiver is a Bluetooth receiver.

19. The method of claim 18, wherein the first switch setting is a wireless local area network (WLAN) switch setting, wherein the first portion of the composite signal is a WLAN portion of the composite signal, wherein the first receiver input signal is a WLAN receiver input signal, wherein the second switch setting is a Bluetooth switching setting, wherein the second portion of the composite signal is a Bluetooth portion of the composite signal, wherein the second receiver input signal is a Bluetooth receiver input signal, and wherein the second signal is a Bluetooth signal.

20. The method of claim 19, wherein amplifying the composite signal comprises amplifying the composite signal using either a first amplifier or a second amplifier.

21. The method of claim 20, wherein the first amplifier is coupled to the antenna and the second amplifier is coupled to the antenna.

22. The method of claim 20, wherein the WLAN switch setting comprises a position of a device that can control signal path or direction, and wherein the device couples the WLAN receiver to the output of either the first amplifier or the second amplifier.

23. The method of claim 22, wherein the device is a switch, wherein determining a WLAN switch setting comprises comparing a feedback WLAN signal with a WLAN threshold, wherein the feedback WLAN signal is a decoded WLAN signal, and wherein the switch couples a WLAN receiver input to the output of the first amplifier when the decoded WLAN signal is less than the WLAN threshold.

24. The method of claim 22, wherein the device is a switch, wherein determining a WLAN switch setting comprises comparing a feedback WLAN signal with a WLAN threshold, wherein the feedback WLAN signal is a decoded WLAN signal, and wherein the switch couples a WLAN receiver input to the output of the second amplifier when the decoded WLAN signal is greater than the WLAN threshold.

25. The method of claim 20, wherein the second switch setting is a Bluetooth switch setting, wherein the Bluetooth switch setting comprises a position of a device that can control signal path or direction, and wherein the device couples the Bluetooth receiver to the output of either the first amplifier or the second amplifier.

26. The method of claim 25, wherein the device is a switch, wherein determining a Bluetooth switch setting comprises comparing a feedback Bluetooth signal with a Bluetooth threshold, wherein the feedback Bluetooth signal is a decoded Bluetooth signal, and wherein the switch couples a Bluetooth receiver input to the output of the first amplifier when the decoded Bluetooth signal is less than the Bluetooth threshold.

27. The method of claim 25, wherein the device is a switch, wherein determining a Bluetooth switch setting comprises comparing a feedback Bluetooth signal with a Bluetooth threshold, wherein the feedback Bluetooth signal is a decoded Bluetooth signal, and wherein the switch couples a Bluetooth receiver input to the output of the second amplifier when the decoded Bluetooth signal is greater than the Bluetooth threshold.

28. The method of claim 20, wherein the second amplifier is coupled to the antenna through a coupling, wherein the coupling has some receive signal power loss without degrading performance or sensitivity of the first amplifier.

29. The method of claim 28, wherein the coupling comprises one or more passive devices and/or active devices.

30. The method of claim 19, wherein decoding the WLAN portion of the composite signal comprises:
   amplifying the WLAN receiver input signal;
   downconverting the WLAN receiver input signal; and
   filtering the WLAN receiver input signal.

31. The method of claim 19, wherein decoding a Bluetooth signal comprises:
   amplifying the Bluetooth receiver input signal;
   downconverting the Bluetooth receiver input signal; and
   filtering the Bluetooth receiver input signal.

32. The method of claim 17, further comprising feeding back the first signal to a switch controller.

33. The method of claim 32, wherein the switch controller is in either an analog portion or a baseband portion.

34. The method of claim 33, further comprising feeding back a Bluetooth signal to the switch controller.

35. The method of claim 32, wherein the switch controller is programmable.

36. An apparatus for receiving a composite signal using a single antenna, comprising:
   means for determining a first switch setting for a first portion of the composite signal;
   means for obtaining a first receiver input signal amplifying the composite signal;
   means for decoding a first signal from the first receiver input signal using a first receiver;
   means for determining a second switch setting for a second portion of the composite signal;
   means for obtaining a second receiver input signal by amplifying the composite signal; and
   means for decoding a second signal from the second receiver input signal using a second receiver, wherein an input of the means for decoding the first signal is switched between an output of the means for obtaining the first receiver input signal and an output of the means for obtaining the second receiver input signal based on the first switch setting of a first switch, and wherein an input of the means for decoding the second signal is switched between the output of the means for obtaining the first receiver input signal and the output of the means for obtaining the second receiver input signal based on the second switch setting of a second switch.

37. The apparatus of claim 36, wherein the composite signal comprises a Bluetooth signal and a wireless local area network (WLAN) signal, and wherein the first receiver is a WLAN receiver and the second receiver is a Bluetooth receiver.

38. The apparatus of claim 37, wherein the first switch setting is a wireless local area network (WLAN) switch setting, wherein the first portion of the composite signal is a WLAN portion of the composite signal, wherein the first receiver input signal is a WLAN receiver input signal, wherein the second switch setting is a Bluetooth switching setting, wherein the second portion of the composite signal is a Bluetooth portion of the composite signal, wherein the second receiver input signal is a Bluetooth receiver input signal, and wherein the second signal is a Bluetooth signal.

39. The apparatus of claim 36, further comprising means for feeding back the first signal to a switch controller.

40. The apparatus of claim 39, wherein the switch controller is in either an analog portion or a baseband portion.

41. The apparatus of claim 39, wherein the switch controller is programmable.

42. An integrated circuit for receiving composite signals comprising:
   a first amplifier coupled to an antenna;
   a second amplifier coupled to the antenna;
   a first receiver, wherein an input of the first receiver is switched between an output of the first amplifier and an output of the second amplifier via a first programmable switch; and
   a second receiver, wherein an input of the second receiver is switched between the output of the first amplifier and the output of the second amplifier via a second programmable switch.

43. The integrated circuit of claim 42, further comprising a coupling between the antenna and the second amplifier, wherein the coupling has some receive signal power loss without degrading performance or sensitivity of the first amplifier.

44. The integrated circuit of claim 43, wherein the coupling comprises one or more passive devices and/or active devices.

45. The integrated circuit of claim 44, wherein the passive devices and/or active devices are reconfigurable through a controller, and wherein an amount of loss in the coupling is programmable.

46. The integrated circuit of claim 44, wherein the passive devices and/or active devices are controlled by control signals, and wherein an amount of the loss is programmed by the control signals.

47. The integrated circuit of claim 42, further comprising a switch controller, wherein the switch controller controls the first switch and the second switch.

\* \* \* \* \*